United States Patent Office 3,302,682
Patented Feb. 7, 1967

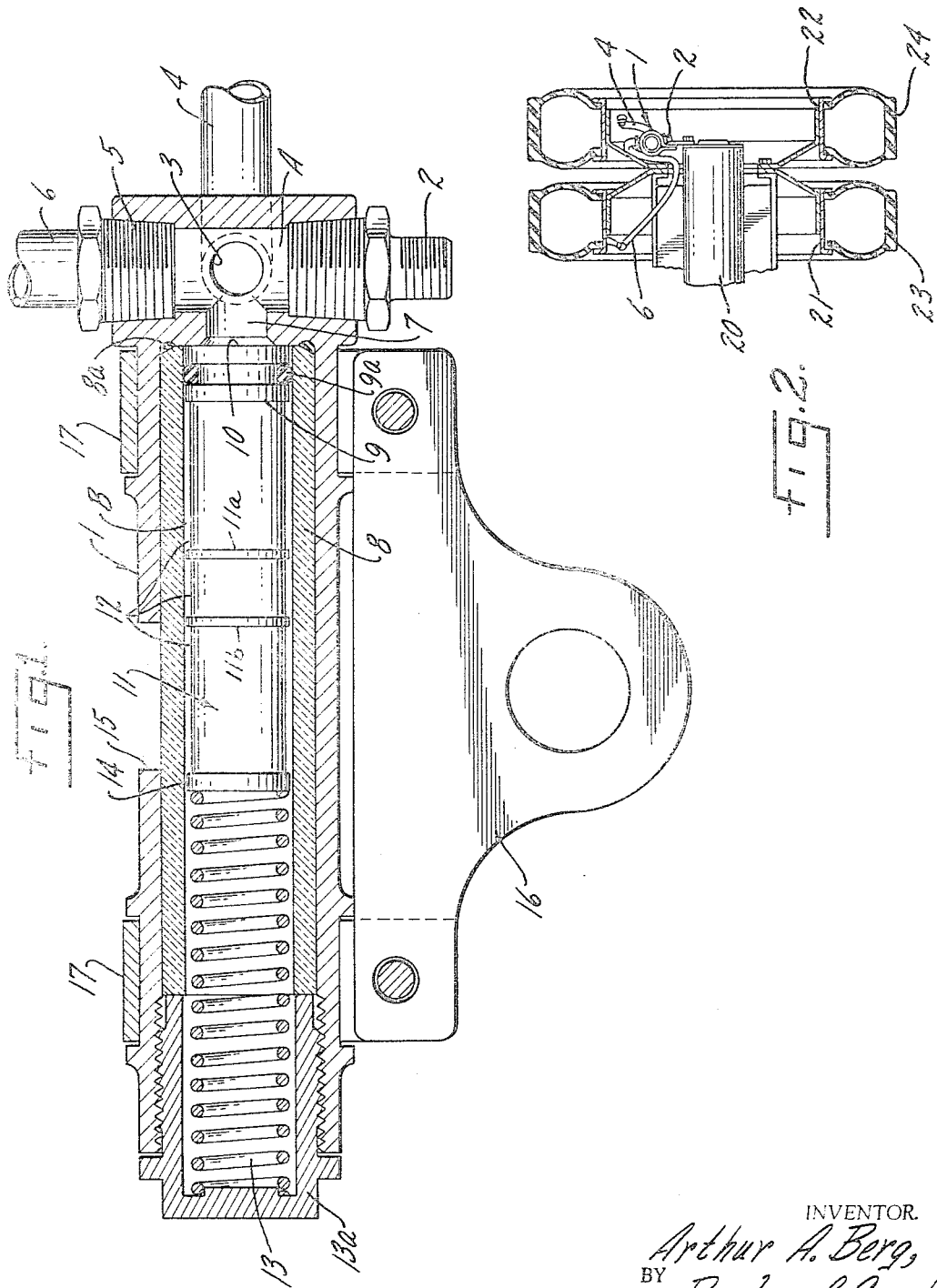

3,302,682
TIRE PRESSURE DEVICE
Arthur A. Berg, Lincolnwood, Ill., assignor, by mesne assignments, to Berg Mfg. & Sales Co., Des Plaines, Ill., a corporation of Illinois
Filed June 1, 1964, Ser. No. 371,630
2 Claims. (Cl. 152—415)

This invention relates to tire pressure devices and has particular relation to a device effective to serve as both a filler and pressure equalization member.

Another purpose is to provide a tire pressure filling device.

Dual-wheeled vehicles such as trucks and trailers have a requirement to maintain adjacent tires on such wheels at uniform, equal pressure. If one tire be inflated to a lower pressure the strain and wear upon the other is excessive and damaging. Similarly, if one such tire should become entirely deflated it is desired that the vehicle operator be made aware of the fact as promptly as possible. Hence it is another purpose of the invention to insure identical pressures, or lack thereof, in adjacent tires.

Another purpose is to provide a tire pressure equalization device for dual-wheeled vehicles.

Another purpose is to provide a device effective to provide for filling of tires with fluid pressure, for equalizing the pressure of separate tires and for indicating the uniform pressure in said tires.

Another purpose is to provide a tire gauge having the additional functions of serving as a filler device and of an equalizer device effective to equalize the pressure in a plurality of tires.

Other purposes will appear from time to time during the course of the specification and claims.

The invention is illustrated more or less diagrammatically in the accompanying drawings, wherein:

FIGURE 1 is a side elevation, with parts in cross section, illustrating the device of the invention; and FIGURE 2 is an illustration, on a reduced scale, illustrating the invention in use with a dual-wheel assembly.

Like parts are indicated by like numerals throughout the specification and drawings.

Referring now to the drawings, and particularly to FIGURE 1, the numeral 1 generally designates a housing. The housing has formed therein a chamber A. Communicating with the chamber A is a filler-neck fitting 2. A conduit opening 3 is formed in the housing 1 for communication with chamber A and a conduit 4 is connected thereto and extends from the housing. A second conduit opening 5 is formed in the housing 1 for communication with chamber A and has secured thereto and extending therefrom a second conduit 6.

The chamber A has a fourth opening or passage 7 in the internal wall thereof for communication with a second chamber B. An elongated tubular or hollow cylindrical bushing 8 is fitted into and substantially fills chamber B, compressing an O-ring seal 8a at its end adjacent opening 7. Member 8 may be conveniently formed of transparent material such as plastic, for example, for purposes which appear hereinbelow. A piston 9 is slidable in cylinder 8 and carries a seal 9a slidably engaging the inner wall of cylinder 8, one side 10 of piston 9 being exposed to chamber A through opening 7.

The piston 9 carries a shaft 11 on the opposite side thereof from the piston side 10, the shaft 11 extending along and within cylinder 8 and having indicia formed on the outer surface 12. A yielding means 13 engages, at one of its ends, a distal end flange 14 on shaft 11 to urge piston 9 toward chamber A. An end plug 13a is threaded into housing 1 and receives the opposite end of spring 13. The housing 1 has a window opening 15 in the wall thereof which exposes a portion of cylinder 8 and through which a portion of the indicia surface 12 may be observed.

Referring now to FIGURE 2, it will be seen that on axle 20 supports, in spaced relation thereon, a set of wheels 21, 22. The housing 1 may be conveniently secured to the outer surface of wheel 22 or to an outer flange, as may be preferred, of the axle 20, the bracket 16 and clamps 17 being provided for the purpose. Wheel 21 carries a pneumatic tire 23 about its periphery and wheel 22 carries a similar pneumatic tire 24 about its periphery. One of the conduits 4, 6 extends to and communicates with the conventional filler neck of tire 24, the conduit 4 being shown in the drawings. The other conduit, the conduit 6 being shown in the drawings, extends from housing 1 to and communicates with the conventional filler neck of tire 23. In those instances where the wheels 21, 22 have no structure present therebetween, the conduit 6 may extends across the space between the wheels 21, 22 outwardly of axle 20, as shown. To provide for those instances, as for example in the case of an aircraft nose wheel assembly, in which a support shaft or other mechanism extends between the wheels 21, 22, and engages an axle, the conduit 6, for example, may be extended through the short axle normally provided for such wheels and radially of wheel 21 for communication with the filler neck of tire 23, suitable connectors being provided for instances in which one wheel is required to turn in variance with the other.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

A source of fluid pressure is connected to filler neck 2. Fluid pressure thereby delivered to chamber A is communicated through openings 3, 5 and conduits 4, 6 to the tires 23, 24 to inflate the same. Pressure thus delivered to chamber A is also effective upon piston 9 to move the same against the action of spring 13 and thus to present the appropriate indicia 12 to window 15 as the tires 23, 24 are inflated. When the indicia presented at window 15 indicates that the tires have been inflated to the desired amount, the pressure source is disconnected from filler neck 2, the filler neck 2 being of a common variety and having appropriate check valve elements (not shown) to prevent escape of pressure from chamber A. Should one of the tires 23, 24 diminish in internal pressure, that fact will be communicated through the appropriate conduits 4 or 6 to the chamber A and the excess pressure in the opposite tire will pass through its associated conduit to the chamber A and from chamber A to the deflated or diminished tire, thus equalizing the pressure at all times between tires 23, 24. Similarly, such uniform pressure will be reflected, at its diminished quantity, by the movement of piston 9 toward chamber A in response to spring 13 and a consequent presentation of a different one of the indicia 12 through window 15. The three segments of piston shaft 11 designated by the numeral 12 may be suitably and differently colored to reflect readily the amount or range of pressure in chamber A and thus in tires 23, 24. Intermediate dividing flanges 11a, 11b conveniently separate the indicia zones 12 and, with flange 14, serve to center and guide shaft 11 as it moves in cylinder 8. It will be understood that indicia 12 may take a variety of forms without departing from the nature and scope of the invention.

I claim:
1. In combination, an elongated tubular housing, a chamber at one end of said housing, a filler opening communicating with said chamber, a pair of spaced outlets communicating with said chamber, a second chamber in said housing, a piston reciprocal in said second chamber, a passage communicating said chambers on one side of said piston and yielding means on the other side of said piston and engaging said piston to urge the same toward said passage and indicia means carried by said piston, a hollow cylindrical member formed of transparent material and substantially filling said second chamber, said cylindrical member slidably receiving said piston, said housing having an opening overlying a portion of said cylindrical member, a shaft extending into said cylindrical member and bearing said indicia, a plurality of annular flanges longitudinally spaced on said shaft and engaging the inner surface of said cylindrical member to center and guide said shaft.

2. A pressure gauge structure for dual tires including a housing, a first chamber at one end of said housing, a plurality of apertures formed in the wall of said housing and communicating with said first chamber, said housing having an elongated tubular portion defining a second chamber, a wall in said housing and dividing said first chamber from said second chamber, a central passage in said wall communicating said first and second chambers, a hollow tubular cylindrical member formed of transparent material and open at both ends, said cylindrical member having an outer diameter substantially equal to the inner diameter of said tubular housing portion and being slidably received therein, said cylindrical member extending through a major segment of said hollow tubular portion, an O-ring seal clamped between said housing wall and one end surface of said cylindrical member, a piston reciprocal in said cylindrical member, said piston having an end face positioned for abutting contact with said housing wall and for exposure to said central passage, a shaft extension secured to and extending from the opposite face of said piston, indicia formed on the external surface of said extension, a yielding member having one of its ends engaging the distal end surface of said extension, said housing tubular portion having an inwardly threaded, open distal end and a plug threadably engaging said distal end of said tubular housing portion, the opposite end surface of said cylindrical member and the opposite end of said yielding member to close said tubular housing portion, to fix said cylindrical member, to compress said O-ring and to cause said spring to urge said piston, through the mediacy of said extension, toward said housing wall, said housing tubular portion having an opening formed in its circumferential wall intermediate the ends thereof and aligned with an intermediate portion of said cylindrical member whereby said indicia may be viewed through said cylindrical member and said opening, and annular flanges axially spaced on said extension and engaging the inner surface of said cylindrical member, said indicia comprising colored surfaces on said extension, said colored surfaces extending between said annular surfaces.

References Cited by the Examiner
UNITED STATES PATENTS

| 2,239,676 | 4/1941 | Henry | 152—415 X |
| 2,362,883 | 11/1944 | Cecil | 152—415 X |
| 2,427,445 | 9/1947 | Davidson | 152—415 |

References Cited by the Applicant
UNITED STATES PATENTS

| 3,208,425 | 9/1965 | Jousma et al. |

FOREIGN PATENTS

| 197,444 | 2/1920 | Canada. |
| 271,579 | 6/1927 | Canada. |
| 399,542 | 9/1941 | Canada. |
| 436,695 | 9/1946 | Canada. |

ARTHUR L. LA POINT, *Primary Examiner.*

C. W. HAEFELE, *Assistant Examiner.*